United States Patent [19]
Keen et al.

[11] Patent Number: 5,237,398
[45] Date of Patent: Aug. 17, 1993

[54] COLOR DIFFERENCE SIGNAL MATRIX AND BUFFER CIRCUIT FOR TELEVISION APPARATUS

[75] Inventors: Ronald T. Keen; Robert L. O'Brien; William A. Lagoni, all of Indianapolis, Ind.

[73] Assignee: Thomson Consumer Electronics, Inc., Indianapolis, Ind.

[21] Appl. No.: 706,597

[22] Filed: May 28, 1991

[51] Int. Cl.$^5$ .............................................. H04N 9/67
[52] U.S. Cl. ..................................................... 358/30
[58] Field of Search ................. 330/250, 252, 295, 69, 330/147, 148; 328/103, 104, 158, 159, 135; 358/23, 30

[56] References Cited

U.S. PATENT DOCUMENTS 2,974,289  3/1961  Cockburn .............................. 358/30
3,719,772  3/1973  Roth ............................. 178/5.4 MA

FOREIGN PATENT DOCUMENTS 1058129  2/1967  United Kingdom ................... 358/30

Primary Examiner—James J. Groody
Assistant Examiner—David E. Harvey
Attorney, Agent, or Firm—Joseph S. Tripoli; Peter M. Emanuel; Richard G. Coalter

[57] ABSTRACT

Two transistors are operated individually as emitter follower buffer amplifiers for R−Y and B−Y input signals and are operated together as an inverting summing matrix for deriving a G−Y output signal from the R−Y and B−Y input signals. All three output signals are "buffered" (i.e., provided by low impedance sources) and are subject to substantially equal delays. Advantageously, the circuit implementation requires only two transistors and three resistors to provide output signals which are (1) buffered, (2) matrixed and (3) delay compensated and which features improved reliability (due to reduced "parts count") and an economic implementation of the buffering, delay compensation and matrixing functions.

4 Claims, 2 Drawing Sheets

COLOR DIFFERENCE SIGNAL MATRIX AND BUFFER CIRCUIT FOR TELEVISION APPARATUS

FIELD OF THE INVENTION

This invention relates to color television signal processing circuits and particularly to color difference signal matrix and buffer circuits of a type for (1) deriving a third color difference signal (e.g., G−Y) from first and second color difference signals (e.g., R−Y and B−Y), (2) which provides a relatively low impedance output (i.e., a "buffered" output) for all three of the color difference signals and (3) which provides minimal differential delay between the output signals.

BACKGROUND OF THE INVENTION

Color television circuits are known which (1) derive a third color difference signal, such as "G−Y" from first and second color difference signals, such as "R−Y" and "B−Y", which (2) provide a relatively low output impedance (i.e., buffered outputs) for all three color difference signals and which (3) feature minimal differential delay among the output signals.

An example of a conventional color difference signal matrix and buffer circuit which provides each and every one of the three (3) foregoing features is described by S. A. Roth in U.S. Pat. No. 3,719,772 entitled COLOR TELEVISION MATRIXING CIRCUIT which issued Mar. 6, 1973.

The Roth circuit includes a source of R−Y and B−Y color difference signals to be matrixed. The R−Y signal is applied to an operational amplifier connected in a non-inverting configuration thereby providing a "buffered" (i.e., low impedance output) for the R−Y signal with a gain determined by a resistive feedback network for the operational amplifier. The B−Y signal is similarly applied to an operational amplifier connected in a non-inverting configuration with a feedback network for determining the B−Y gain and providing a low output impedance.

The G−Y signal is produced by applying the R−Y and B−Y input signals via respective input resistors to the summing (i.e., inverting) input of a third operational amplifier connected in an inverting configuration. The third operational amplifier provides a weighted and inverted sum of the R−Y and B−Y input signals determined by the two input resistors and the feedback resistor thereby generating (matrixing) a G−Y output signal which is buffered (i.e., provided at a low impedance) by the third operational amplifier.

In the Roth circuit, differential delay errors are minimized because the delay of the inverting differential amplifier, which provides matrixing of the G−Y signal, is offset or compensated for by the similar delays of the two non-inverting differential amplifiers which buffer the R−Y and B−Y signals.

SUMMARY OF THE INVENTION

The above-described delay compensated color difference signal matrix and buffer circuit provides excellent performance with respect to (1) matrixing G−Y from R−Y and B−Y, (2) buffering all three signals and (3) ensuring minimal differential delays among the output signals.

However, the known circuit requires three operational amplifiers and a large number of input and feedback resistors.

It is herein recognized that a need exists for a simplified circuit providing (1) matrixing one color difference signal from two color difference input signals, (2) for buffering all three of the input and matrixed color difference signals, (3) for providing minimal differential delays between the buffered and matrixed color difference signals and (4) which requires no operational amplifiers and substantially fewer resistors than the prior art arrangement described above.

Each and every one of the four (4) foregoing objectives is achieved in the present invention by a circuit requiring only two (2) transistors and three (3) resistors.

Advantageously, the arrangement of the present invention provides all of the (1) matrix, (2) buffering and (3) delay compensation features of the prior art arrangement described above and provides the additional advantages of increased reliability and reduced cost due to the substantial reduction of the number of circuit elements employed.

A color difference signal matrix and buffer circuit for use in color television apparatus and embodying the invention comprises first and second input terminals for receiving, respectively, first and second color difference input signals. First, second and third output terminals provide, respectively, a first color difference output signal, a second color difference output signal and a third color difference output signal. The first and second output terminals are coupled via respective ones of first and second resistors to a first potential source and the third output terminal is coupled via a third resistor to a second potential source. The first input terminal is connected to the control electrode of a first transistor having a conduction path coupled between the first and third output terminals. The second input terminal is connected to the control electrode of a second transistor having a conduction path coupled between the second and third output terminals.

BRIEF DESCRIPTION OF THE DRAWING

The foregoing and further features of the invention are illustrated in the accompanying drawing wherein line elements are denoted by like reference designators and in which.

DETAILED DESCRIPTION

Figure 1:
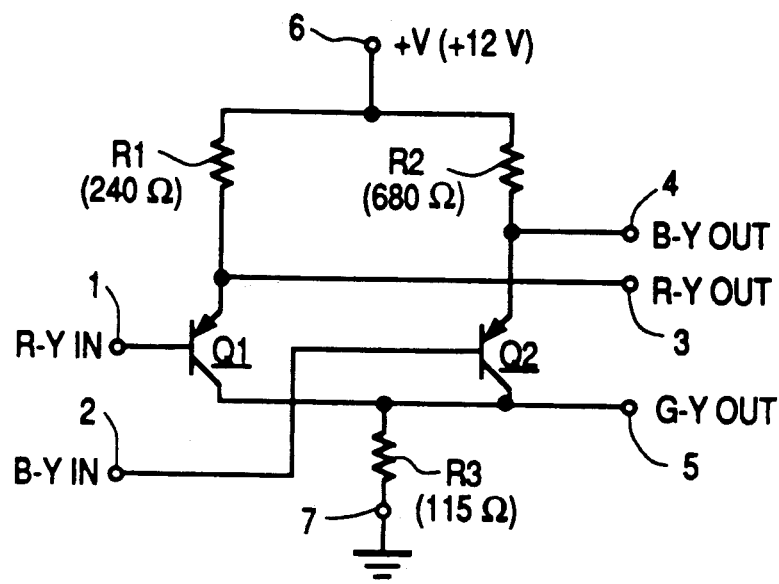
FIG. 1 is a circuit diagram of a color difference signal matrix and buffer circuit embodying the invention and including representative element values.

The color difference signal matrix and buffer circuit of FIG. 1 comprises first (1) and second (2) input terminals for receiving, respectively, first and second color difference input signals R−Y and B−Y, respectively. Also included are first (3), second (4) and third (5) output terminals for providing, respective ones of a first color difference signal (R−Y), a second color difference signal (B−Y) and a third color difference output signal (G−Y). The circuit also includes a first supply terminal 6 which, in this embodiment of the invention provides a positive supply voltage +V and a second supply terminal 7 which, in this embodiment of the invention is connected to ground so that supply terminal 6 is positive with respect to supply terminal 7.

With regard to alternative power supply connections in this embodiment of the invention, supply terminal 6 could be coupled to ground and a negative voltage applied to supply terminal 7. As another alternative, supply terminal 6 could be coupled to receive a supply voltage +V as shown and supply terminal 7 could be coupled to receive a negative supply voltage or a positive supply voltage less than +V. Of importance, in this embodiment of the invention, is that supply terminal 6 be positive with respect to supply terminal 7.

The remainder of FIG. 1 comprises only three resistors (R1, R2 and R3) and two transistors (Q1 and Q2). The first resistor R1 is connected between the first supply terminal 6 and the first output terminal 3. The second resistor R2 is connected between the first supply terminal 6 and the second output terminal 4. The third resistor R3 is connected between the second supply terminal 7 and the third output terminal 5.

The first transistor Q1 has a control electrode connected to the first input terminal 1 and a conduction path connected between the first and third output terminals 5 and 3, respectively. In this embodiment of the invention the first transistor Q1 comprises a PNP transistor having base, emitter and collector electrodes connected to the first input terminal 1, the first output terminal 3 and the third output terminal 5, respectively.

The second transistor Q2 has a control electrode connected to the second input terminal 2 and a conduction path connected between the second and third output terminals 4 and 5, respectively. In this embodiment of the invention the second transistor Q2 comprises a PNP transistor having base, emitter and collector electrodes connected to the second input terminal 2, the second output terminal 4 and the third output terminal 5. Subsequent examples of the invention give examples of three other types of transistors suitable for use in place of the first and second transistors Q1 ant Q2.

In operation, transistors Q1 and Q2 function, in part, as emitter follower buffer amplifiers which couple the R−Y and B−Y input signals to output terminals 3 and 4, respectively, and so provide a low output impedance for the coupled R−Y and B−Y signals.

Transistors Q1 and Q2, in addition to serving as buffer amplifiers (i.e., unity gain emitter followers) for the R−Y and B−Y input signals also provide matrixing of the G−Y output signal from the R−Y and B−Y input signals. This is done without introducing differential delays between the R−Y, B−Y and G−Y signals by combining the collector currents of transistors Q1 and Q2 in the common load resistor R3 which, as described above, both transistors share.

In more detail, there can be no substantial timing error among the R−Y, B−Y and G−Y output signals because whatever delay there may be in buffering the R−Y signal by transistor Q1 is the same as the delay in buffering the B−Y signal by transistor Q1. Since the same current flows in the emitter of an emitter follower transistor as in its collector, it follows that the collector currents of transistors Q1 and Q2 are not substantialy delayed with respect to the respective emitter currents and therefore when the collector currents are added in the common collector resistor R3 there is no net delay difference between the buffered emitter signals R−Y and B−Y developed across R1 and R2 and the collector signal G−Y developed across the common collector load resistor R3.

Advantageously, since the signal delays are equal for R−Y, B−Y and G−Y, there is no requirement at all for delay equalization devices for compensation of delay differences between the R−Y, B−Y and G−Y video output signal requires The values of resistors R1, R2 and R3 are not equal. This is because generation of a G−Y video output signal requires different proportions of the R−Y and B−Y input signals and the exact relationship of the values of resistors R1, R2 and R3 can vary depending upon the specific colorimetry of the kinescope selected to display the signals.

More specifically, the G−Y output is defined by the following relationship:

$$(G-Y) = -\{K[R-Y] + M[B-Y]\} \qquad (1)$$

wherein K=(R3/R1), M=(R3/R2), and R1, R2 and R3

The parameters K and M above define the proportions of the R−Y and B−Y signals used to from the G−Y signal. The inversion (i.e., minus sign preceding equation (1)) is provided inherently in the circuit design because the G−Y signal is taken from the collectors of transistors Q1 and Q2 and so is inverted with respect to the buffered R−Y and B−Y signals at the emitters.

As to the parameters K and M, the specific values of these parameters depend to a certain extent upon the colorimetry of the specific kinescope used to display the images. Roth, the in aforementioned U.S. Pat. No. 3,719,772 gave exemplary values of the corresponding parameters in his embodiment of the invention as being K=0.57966 and M=0.378324. In fact, there is wide latitude in selecting the values of K and M depending upon the picture tube used. For example, when the example of FIG. 1 was tested in a receiver having a picture tube employing a cadmium based green phosphor the appropriate values of K and M were about 0.32 and 0.07, respectively. In another test using a picture tube not having a cadminum based phosphor the most appropriate values of K and M were found to be about 0.48 and 0.17, respectively. In a specific application, one may vary the parameters K and M to arrive at an optimum choice for a specific picture tube.

In more general terms, since K and M define the ratios R3/R1 and R3/R2, respectively, the relative values of the resistors R1, R2 and R3 should be selected such that:

$$R2 > R1 \text{ and} \qquad (2)$$

$$R1 > R3 \qquad (3)$$

$$\text{so that } R2 > R1 > R3 \qquad (4)$$

The inequality (4) above specifies that the values of the second resistor R2 is greater than that of the first resistor R1 and both are greater than that of the third resistor R3. One may readily calculate specific resistor values from the relationships that R3/R1=K and R3/R2=M. Illustratively, in the example of FIG. 1 for the case where K=0.48 and M=0.17 the values of the resistors R1, R2 and R3 were selected to be 240 Ohms, 680 Ohms and 115 Ohms, respectively.

There has been shown and described a color difference signal matrix and buffer circuit providing (1) matrixing G−Y from R−Y and B−Y input signals, (2) buffering all three output signalsl (3) ensuring minimal delays among the output signals and (4) which may be implemented with only two transistors (Q1 and Q2) and three resistors (R1, R2 and R3).

Figure 2:
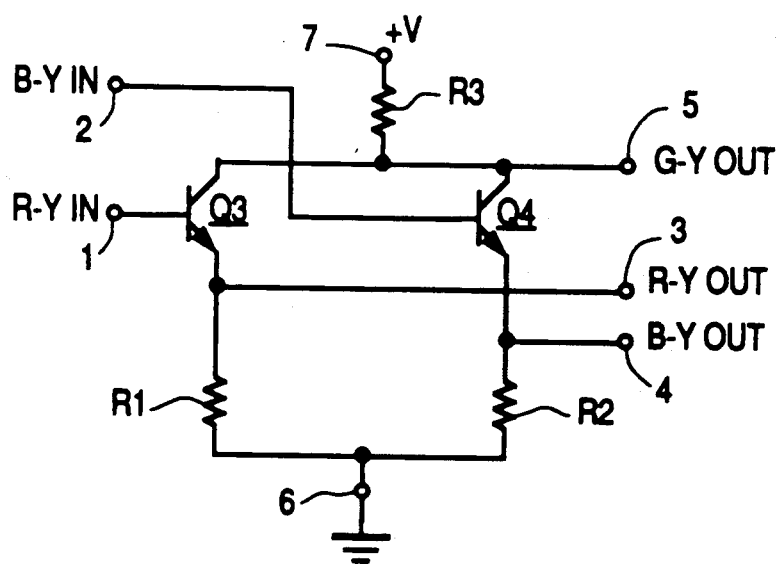
FIGS. 2, 3 and 4 are circuit diagrams illustrating alternative embodiments of the color difference signal matrix and buffer circuit of FIG. 1.
Figure 3:
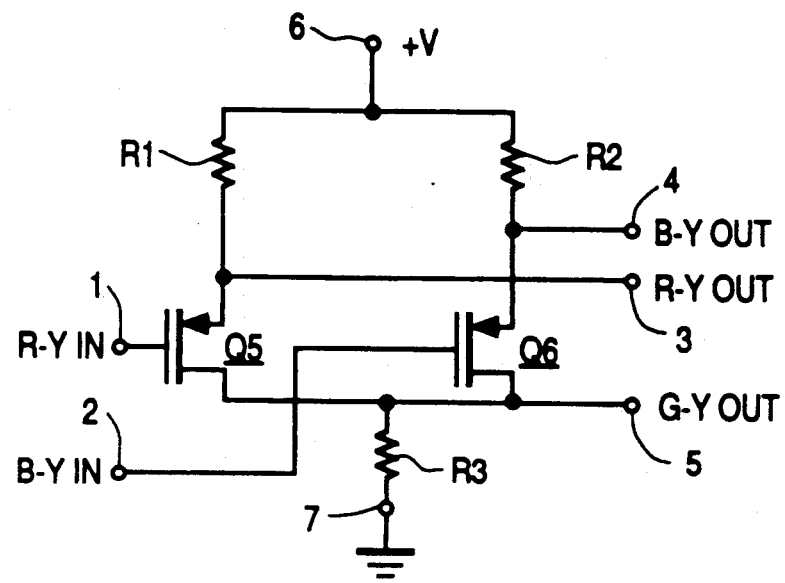
Figure 4:
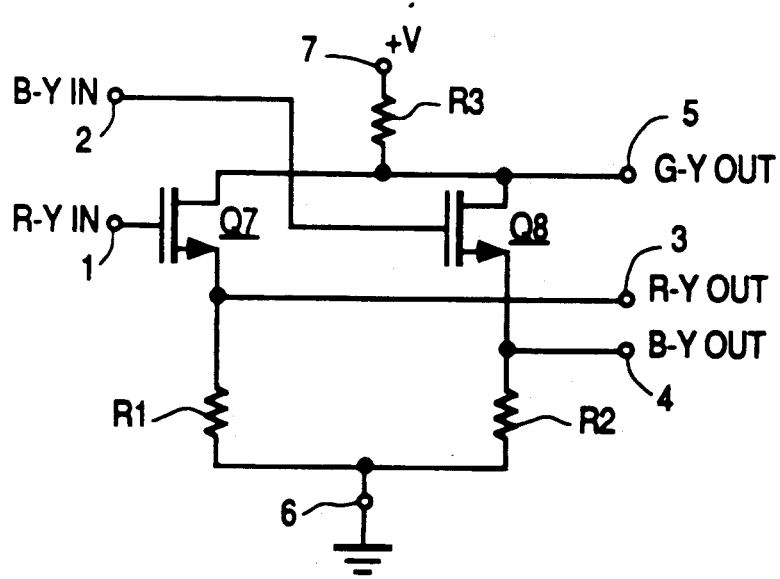

Various changes and modifications may be made to the specific embodiment of the invention shown and described in FIG. 1. As a first example, shown in FIG. 2, the PNP transistors Q1 and Q2 are replaced with NPN transistors Q3 and Q4, respectively. Also, the relative supply polarities are reversed (e.g., terminal 6 is grounded and terminal 7 is connected to the +V supply source so that terminal 7 is positive with respect to terminal 6). Aside from these transistor type selection and supply polarity differences, the operation of the circuit of FIG. 2 is the same as that of FIG. 1. As a second example, in FIG. 3 the example of FIG. 1 is modified by replacing the PNP transistors Q1 and Q2 with P-channel field effect transistors Q5 and Q6. Operation of this example of the invention is the same as that of FIG. 1 except for the change to field effect transistors. The example of FIG. 4 is similar to that of FIG. 2 except that N-channel field effect transistors Q7 and Q8 replace the N-type bipolar transistors Q3 and Q4. Other changes may be made to the embodiments of the invention herein shown and described such as constructing the circuitry within an integrated circuit.

What is claimed is:

1. A color difference signal matrix and buffer circuit employing solely two transistors for providing three matrixed and buffered output signals, comprising:

first and second input terminals for receiving, respectively, an R−Y video input signal and a B−Y video input signal;

first, second and third output terminals for providing, respectively, an R−Y video output signal, a B−Y video output signal and a G−Y video output signal;

first and second sources of potential, the first being positive with respect to the second;

a first resistor connected between said first source of potential and said first output terminal;

a second resistor connected between said first source of potential and said second output terminal;

a third resistor connected between said second source of potential and said third output terminal;

a first PNP bi-polar transistor having base, emitter and collector electrodes connected to respective ones of said first input terminal, said first output terminal and said third output terminal; and a second PNP bi-polar transistor having base, emitter and collector electrodes connected to respective ones of said second input terminal, said second output terminal and said third output terminal.

2. A color difference signal matrix and buffer circuit employing solely two transistors for providing three matrixed and buffered output signals, comprising:

first and second input terminals for receiving, respectively, an R−Y video input signal and a B−Y video input signal;

first, second and third output terminals for providing, respectively, an R−Y video output signal, a B−Y video output signal and a G−Y video output signal;

first and second sources of potential, the second being positive with respect to the first;

a first resistor connected between said first source of potential and said first output terminal;

a second resistor connected between said first source of potential and said second output terminal;

a third resistor connected between said second source of potential and said third output terminal;

a first NPN bi-polar transistor having base, emitter and collector electrodes connected to respective ones of said first input terminal, said first output terminal and said third output terminal; and a second NPN bi-polar transistor having base, emitter and collector electrodes connected to respective ones of said second input terminal, said second output terminal and said third output terminal.

3. A color difference signal matrix and buffer circuit employing solely two transistors for providing three matrixed and buffered output signals, comprising:

first and second input terminals for receiving, respectively, an R−Y video input signal and a B−Y video input signal;

first, second and third output terminals for providing, respectively, an R−Y video output signal, a B−Y video output signal and a G−Y video output signal;

first and second sources of potential, the first being positive with respect to the second;

a first resistor connected between said first source of potential and said first output terminal;

a second resistor connected between said first source of potential and said second output terminal;

a third resistor connected between said second source of potential and said third output terminal;

a first P-channel field effect transistor having gate, source and drain electrodes connected to respective ones of said first input terminal, said first output terminal and said third output terminal; and a second P-channel field effect transistor having gate, source and drain electrodes connected to respective ones of said second input terminal, said second output terminal and said third output terminal.

4. A color difference signal matrix and buffer circuit employing solely two transistors for providing three matrixed and buffered output signals, comprising:

first and second input terminals for receiving, respectively, an R−Y video input signal and a B−Y video input signal;

first, second and third output terminals for providing, respectively, an R−Y video output signal, a B−Y video output signal and a G−Y video output signal;

first and second sources of potential, the second being positive with respect to the first;

a first resistor connected between said first source of potential and said first output terminal;

a second resistor connected between said first source of potential and said second output terminal;

a third resistor connected between said second source of potential and said third output terminal;

a first N-channel field effect transistor having gate, source and drain electrodes connected to respective ones of said first input terminal, said first output terminal and said third output terminal; and a second N-channel field effect transistor having gate, source and drain electrodes connected to respective ones of said second input terminal, said second output terminal and said third output terminal.

* * * * *